(No Model.)

J. C. MONTGOMERIE.
PROCESS OF TREATING CYANID SOLUTIONS.

No. 580,948. Patented Apr. 20, 1897.

Witnesses.
Thos. P. Elam.
W. F. Cain.

Inventor.
John C. Montgomerie
per G. M. Hardingham
Attorney.

UNITED STATES PATENT OFFICE.

JOHN C. MONTGOMERIE, OF DALMORE, STAIR, SCOTLAND.

PROCESS OF TREATING CYANID SOLUTIONS.

SPECIFICATION forming part of Letters Patent No. 580,948, dated April 20, 1897.

Application filed June 11, 1896. Serial No. 595,195. (No specimens.)

*To all whom it may concern:*

Be it known that I, JOHN CUNINGHAME MONTGOMERIE, a subject of the Queen of Great Britain and Ireland, residing at Dalmore, Stair, in the county of Ayr, Scotland, have invented certain new and useful Improvements in and in Connection with the Treatment of Cyanid Solutions of the Precious Metals, of which the following is a specification.

This invention relates to the treatment of solutions of cyanid of potassium (sodium, ammonium, or the like) containing gold and silver with a view to the separation and collection of the precious metals and the recovery of cyanid—as, for example, ammonium cyanid—and ammonia resulting from the decomposition of the cyanid.

The invention further relates to means for regenerating the filtering agent employed.

Figure 1:
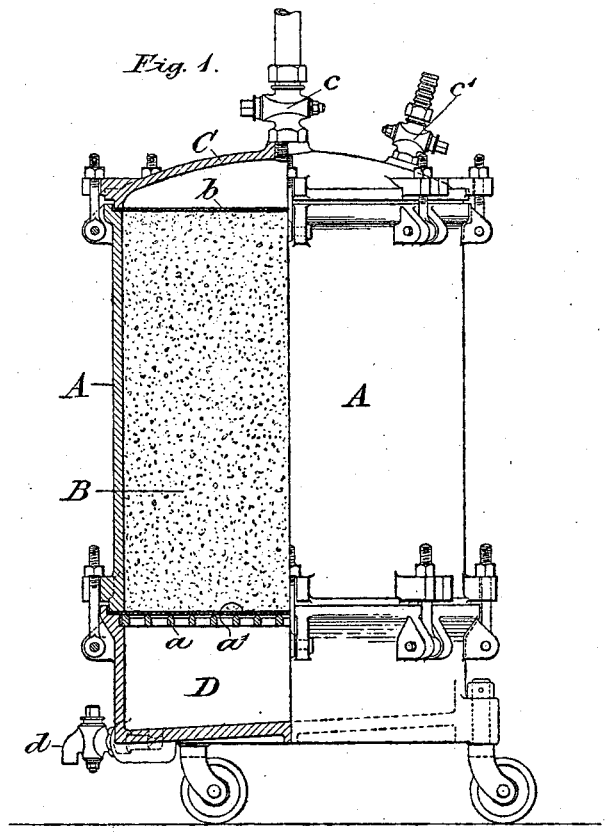
Figure 2:
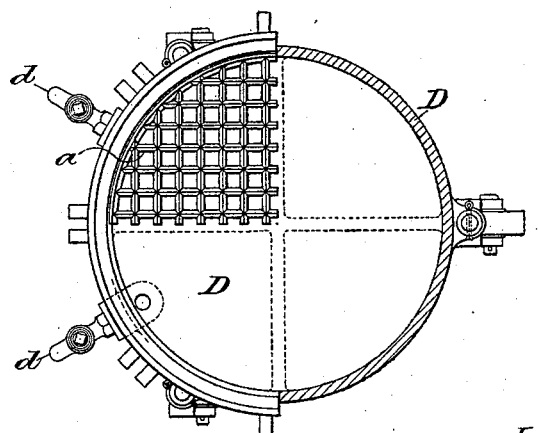

In the accompanying drawings, Figure 1 is a view, partly in vertical section and partly in elevation, of a filter adapted for employment in the treatment of cyanid solutions according to this invention. Fig. 2 is a plan of the lower portion of the apparatus.

Assuming the ground ore to have been treated with a solution of potassium cyanid and filtered for the purpose of separating the solid from the liquid portion of the charge, the effluent containing the unused chemicals and the precious metals in solution is passed through a wood-charcoal filter (preferably made from hard wood) or a series of such filters, the construction of which is hereinafter more particularly described. The precise action of the charcoal on such a solution is somewhat doubtful, but the chemical reactions appear to be as follows: The precious metals are liberated from the double cyanid of gold (or silver) and potassium and precipitated in a metallic state upon the charcoal, while the cyanogen is absorbed by the charcoal. A portion of the free cyanid of potassium is decomposed, the potassium forming with the water a hydrate passing through the charcoal, while the cyanogen liberated is converted into hydrocyanic acid and is absorbed therein. The following equations represent the probable reactions:

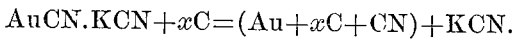

The result of this action is that the charcoal in a short time ceases to effect the separation and precipitation of the precious metals. This stage having been reached the charcoal is, according to the present practice, burned for the purpose of recovering the precious metals, the cyanogen present being dissipated by the heat and lost.

Instead of burning the charcoal, as above described, I retort it or pass superheated steam or hot air or a combination thereof through the same for the purpose of decomposing the cyanogen, its nitrogen uniting with the hydrogen of the steam when used and of the steam generated from the water of saturation contained in the charcoal and forming ammonia. By a secondary reaction the ammonia is converted into ammonium cyanid and ammonium bicarbonate by the action of the carbonic oxid and carbonic acid. The following equations represent the probable reactions:

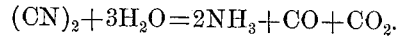

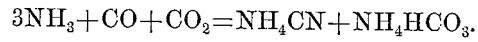

The hydrocyanic acid evolved in the decomposition of the cyanid of potassium in the former equation is converted into ammonium cyanid and ammonium bicarbonate by the action of the heat and steam upon the charcoal and hydrocyanic acid. The following equation represents the probable reactions:

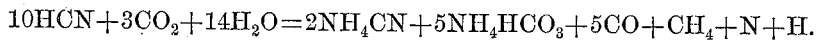

The gases and vapor yielded pass off and are condensed, yielding ammonium cyanid and ammonium bicarbonate in solution. These products may be decomposed by heat, the ammonia yielded being conveyed into water and recovered therefrom in the usual way and converted into sulfate of ammonia or used in the manufacture of a cyanid. I prefer, however, to use the solution, the result of the aforesaid process of condensation, in the extraction of the precious metals. Should it be found deficient in cyanogen, it must be fortified to the original strength. The charcoal is now free from the cyanogen or its compounds which rendered it inert and is fit for further use in the extraction of the precious metals from cyanid solutions containing the same.

By frequent regeneration of the charcoal in the manner above described I have been enabled to deposit at the rate of two thousand ounces of the precious metals in a ton of charcoal before resorting to the burning of the charcoal.

Before reusing the charcoal I cool it down to the temperature of the atmosphere by passing cold air therethrough. In passing hot air or steam through the charcoal care must be taken not to apply it at such a temperature as to cause the combustion of the charcoal.

In constructing a charcoal filter adapted for use in my improved process I employ an iron, enameled, or other suitable vessel A, containing wood-charcoal B in a powdered or granulated state capable of passing a one-fourth-inch-mesh sieve about two feet thick and lightly rammed. The vessel is provided with a false bottom $a$, covered with asbestos or other non-combustible fabric or material $a'$. A sheet of asbestos cloth $b$ or a piece of perforated iron, stoneware, or tile is also placed upon the top of the charcoal B to prevent it floating and to protect it against disturbance. The filter is closed with a removable top C and is furnished with pipe connections $c$ and $c'$ for the liquid and air and for the resultant gases flowing to the condenser, respectively.

D is a chamber for the reception of the filtered liquid, and $d$ $d$ are cocks for draining the same.

No claim is, however, made on the present occasion in respect of this method of construction or of the details described.

Another mode of charging the filter is to grind the charcoal to a powder, mix it with a little water to form a paste, and then press it evenly into the filter, suction being at the same time applied below. In this case a thickness of six inches will suffice, but in working suction must be applied to draw the liquid through the comparatively dense mass of filtering material.

By the foregoing methods the whole of the precious metals may be extracted from the solution, as shown by fire assay, the consumption of charcoal largely economized, and a large portion of the cyanid recovered in the form of ammonium cyanid and ammonium bicarbonate, or sulfate of ammonia, if desired.

Cyanid solutions which have been employed in the extraction of the precious metals and which, in addition to such metals, contain caustic alkali, dioxids, nitrates, nitrites, sulfates, carbonates or bicarbonates, bromin, chlorin, or their compounds may be treated in a similar manner for the recovery of the precious metals and of the cyanogen and its compounds.

What I claim as my invention, and desire to secure by Letters Patent, is—

1. The herein-described process for the extraction of the precious metals from cyanid solutions containing the same, which consists in filtering the solution through a charcoal filter, heating the filtering material on the same becoming surcharged with cyanogen or its compounds, condensing the resultant gases and obtaining ammonium cyanid and other ammonium salts in solution, applying the regenerated charcoal (still containing the precious metals) in the filtration of a further charge or charges of the solution, and ultimately recovering from the charcoal the precious metals accumulated therein.

2. In the extraction of the precious metals from cyanid solutions with the aid of a charcoal filter, the herein-described method of treating the filtering material for the regeneration of the charcoal and the recovery of the cyanogen compounds; such method consisting in repeatedly heating the filtering material as often as it becomes inert, condensing the gases evolved and recovering from the latter the cyanogen compounds.

JOHN C. MONTGOMERIE.

Witnesses:
G. G. M. HARDINGHAM,
W. F. CAIN.